2 Sheets—Sheet 1.

W. O. GROVER & W. E. BAKER.

SEWING MACHINE.

No. 1,242½. Reissued Dec. 3, 1861.

Witnesses.
Saml. P. Bell
L. Bonworth

Inventors.
W. O. Grover
W. E. Baker
per Francis Rodier Jr.

THE NORRIS PETERS CO. PHOTO-LITHO. WASHINGTON, D. C.

2 Sheets—Sheet 2.

W. O. GROVER & W. E. BAKER.

SEWING MACHINE.

No. 1,242½. Reissued Dec. 3, 1861.

Witnesses.
J. Bosworth
Saml P. Bell

Inventors
W O Grover
W E Baker
by Benjy Robinson
Attorney

UNITED STATES PATENT OFFICE.

W. O. GROVER, OF JAMAICA PLAIN, AND WM. E. BAKER, OF BOSTON, MASS., ASSIGNORS TO GROVER & BAKER SEWING MACHINE COMPANY.

IMPROVEMENT IN SEWING-MACHINES.

Specification forming part of Letters Patent No. 7,931, dated February 11, 1851; Reissue No. 568, dated June 15, 1858; Reissue No. 1,242½, dated December 3, 1861.

*To all whom it may concern:*

Be it known that we, WILLIAM O. GROVER, of Jamaica Plain, Massachusetts, and WILLIAM E. BAKER, of Boston, Massachusetts, have invented new and useful Improvements in Sewing-Machines, for which Letters Patent were duly issued to us on the 11th day of February, A. D. 1851, and reissued June 15, 1858, which Letters Patent are inoperative or invalid by reason of a defective and insufficient description and specification. We, WILLIAM O. GROVER and WILLIAM E. BAKER, aforesaid, do therefore now make known the following as a full, clear, and exact amended description and specification of claim of our invention.

Figure 1:
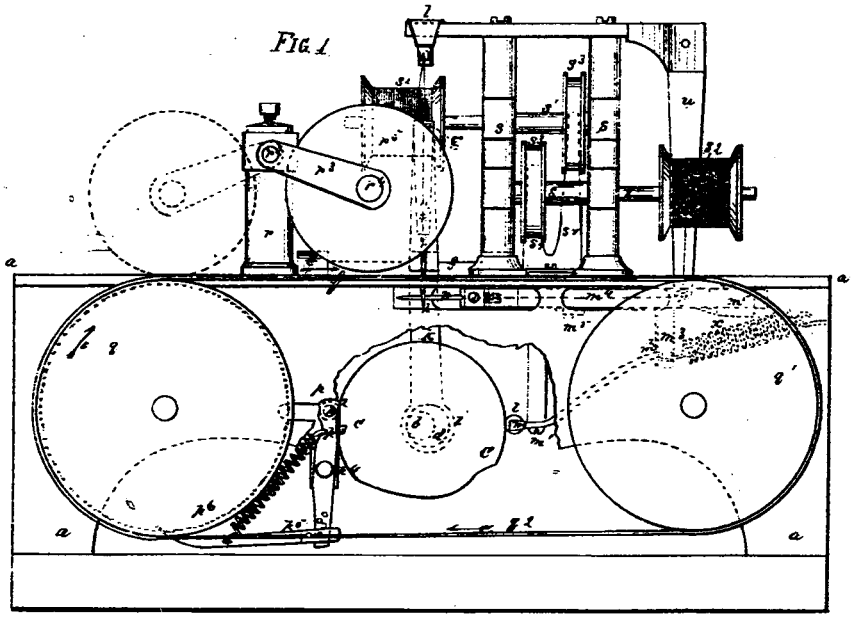
Figure 2:
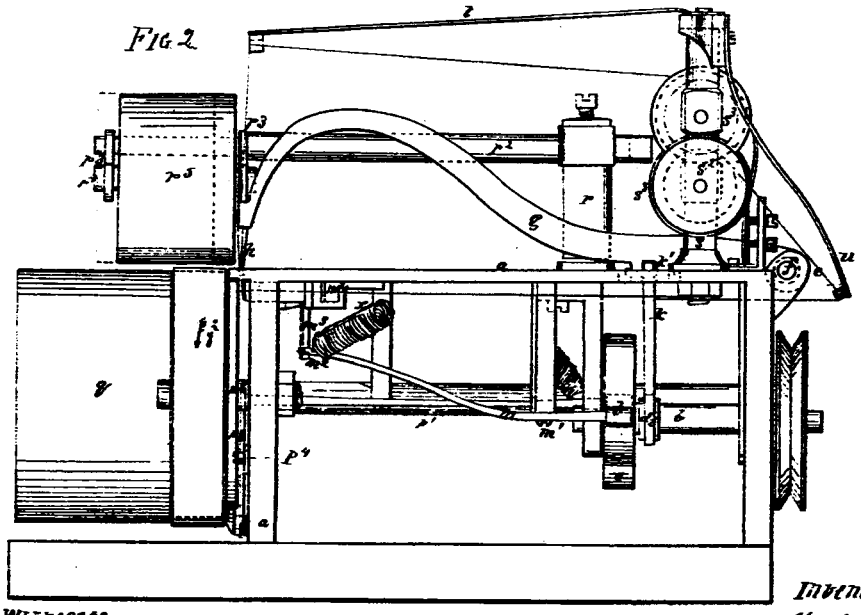
Figure 3:
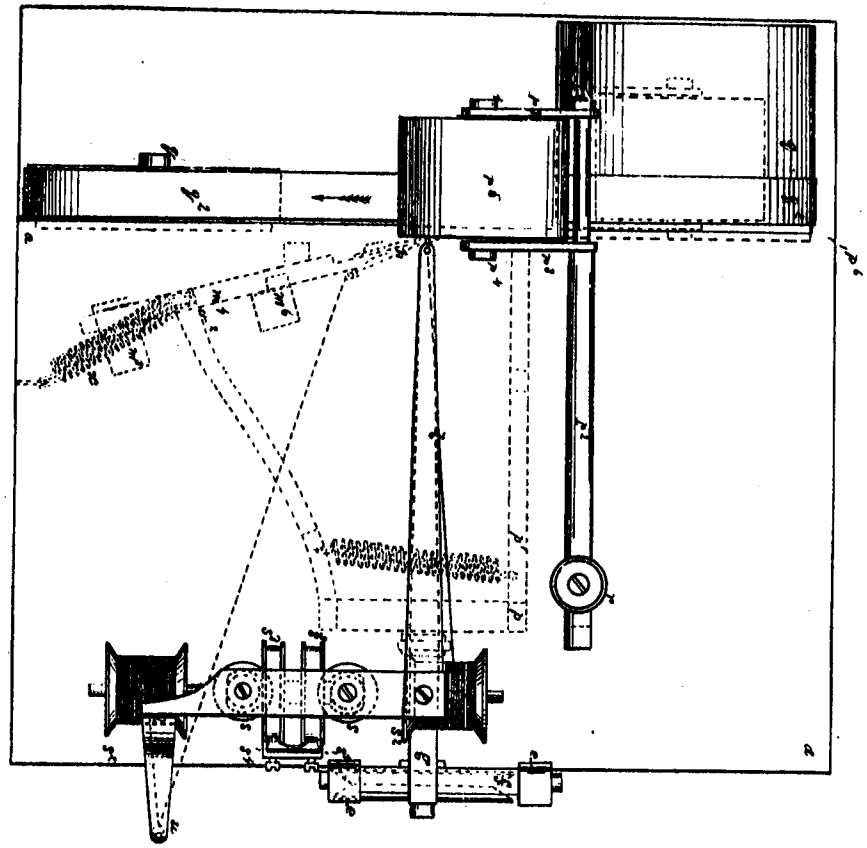
Figure 4:
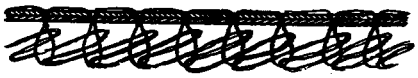

In the drawings, Figure 1 is a front elevation of the machine. Fig. 2 is a side elevation thereof. Fig. 3 is a plan of the machine. Fig. 4 is a sketch of the stitch made by the machine, the needle-thread being colored red and the second or lower thread blue, the stitch being represented as loose or not drawn up, so that the manner of interlocking may be plainly seen.

This machine makes from two threads, furnished from two spools, a secure and peculiarly-elastic double-looped seam, superior for many purposes to any seam made by any machine heretofore in use. This seam is made by employing, in combination, a horizontal table, a stitching apparatus consisting of an eye-pointed perforating-needle, and a non-perforating instrument or thread-carrier, and a feeding apparatus to which the cloth is not attached, and which causes it to progress in such a manner that seams of indefinite length may be sewed either in curved or straight lines.

We have sought as our object to produce a machine which should have the three following characteristics: First, that it shall sew direct from two spools the peculiar seam or stitch herein described; second, that the material sewed shall be so held horizontally in reference to the needle, thread-carrier, and operator that the upper or face side of the seam shall be made upon the horizontal upper surface of the material and toward the operator, so as to be readily inspected and examined by the operator during the progressive operation of the machine, and the loop side of the seam shall be made below and upon the horizontal under surface of the material; third, that the material be so held and fed that the direction of the seam during such progressive operation of the machine can be at all times changed or varied at the pleasure of the operator, and so that seams of indefinite length can be sewed. We have secured this object as follows: First, we have combined and arranged an eye-pointed needle carrying the thread, which is passed through the material to be sewed, a thread-carrier carrying the thread which is not passed through the material, and a table or support upon which the material is held and supported horizontally while being sewed. In this combination the needle descends at each stitch in a vertical plane, carrying a loop of thread, and passes its point through the material supported on the table until its eye is below the under surface of the cloth and below the upper surface of that portion of the table or support which immediately surrounds the needle sufficiently to allow the loop of needle-thread to be secured below the cloth by a loop of thread carried by the thread-carrier. The thread-carrier in this combination is located beneath the upper surface of the table or support, and its functions are such that loops of its thread are inserted through loops of needle-thread, and that the needle, after descending below the cloth and support, enters or passes into loops of thread governed or presented by the thread-carrier. In this combination the table supports the material horizontally under the needle and above the thread-carrier. Second, we have combined a horizontal table, a stitching mechanism consisting of a needle and thread carrier, or its equivalent, and a mechanical feed to which the cloth is not attached, but is left free to be turned in any direction by the operator while being fed regularly stitch by stitch through the machine.

The following are the leading functions performed by each of the elements of said combinations: The table operates to support the material while being sewed, dispensing with pins, hooks, or clamps to hold it up. It also bears up the material against the thrust of the needle in a horizontal position, or nearly so, so that the top of the seam may be seen as made, and the face-stitch be thus accurately and properly set. It also presents the material so that it may be seized by the feeding apparatus, and by holding it in position below the needle and above the thread-carrier during their action upon it in forming the stitches and completing the seam, the table operates in combination with those devices and enables them to perform their functions properly. The feed apparatus carries the material along at proper times, and holds it at rest at proper times, so as to space the stitches to form a seam, and co-operates with the stitching apparatus and the table in making the stitches and seam, removing loops of upper thread held below the cloth out of the way of the needle; and its essential characteristics are that, while performforming these duties or any of them, it never holds the material so that it cannot be turned upon the table, and so takes hold of the material to move it that any length of cloth may be fed through the machine without stopping it, and the spot or portion of the cloth taken hold of is changed at every stitch, and these characteristics distinguish it from a class of feed apparatus of which that known as the "baster-plate" in the Howe machine, and as a "clamp-feed" in the Morey & Johnson machine, may be taken as types. The stitching apparatus when aided by the table and feed apparatus, makes a seam of threads interlocked as shown in Fig. 4, but drawn up tight, and the interlockings are effected by the agency of a needle and a thread-carrier. The needle moves in a vertical plane, or nearly so, and acts to pierce the cloth and carry its thread through it, so that a loop of second thread can be inserted within a loop of needle-thread beneath the material. It also passes a loop of its own thread between the thread-carrier and the lower thread. The thread-carrier inserts a loop of lower thread between the needle and the upper thread, and holds its own thread so that the needle can pass between the thread-carrier and the lower thread. It also at proper times has around its body a loop of upper thread, and at other times is not surrounded by this loop. These are the distinguishing characteristics of the operation of the table, feed, and stitching mechanism, considered separately; but in order that these characteristic functions of these three parts may be properly performed in the automatic action of the machine in sewing a seam, each of the other parts must perform at the same time their respective characteristic duties.

Our invention consists, first, in the combination and arrangement described of a needle, a horizontal table, and a thread-carrier or instrument governing a lower or second thread in such manner that the needle descends in a vertical plane through the cloth, held horizontally upon and by the table, and so that the thread-carrier acts always beneath the cloth, in order that the face or fair side of the stitch may be made on the upper surface of the cloth, and the looped side of the seam may be formed on the under side thereof.

Our invention consists, secondly, in combining together a horizontal table, a stitching apparatus, and a feeding apparatus having, essentially, characteristics and functions as above set forth, whereby a seam of indefinite length, and either straight or curved, may be sewed, the upper and lower threads being interlocked or looped one with the other, as shown in Fig. 4, but drawn up tight, and the face of the stitch appearing on the upper side as made.

The machine represented in the drawings shows a mode of embodying our invention in a practical form, and in the drawings, *a a* is a strong table on whose upper surface the material to be sewed is supported. This table, also, as a convenient method of construction, serves to assemble together all parts of the machine. Beneath the surface of this table is supported, in proper bearings, a shaft, *b b*, which may be driven by a crank, pulley, or gearing, and on this shaft is fixed a cam, *c c*, and an eccentric, *d*. At one side of the table are two lugs, *e e*, which support a rock-shaft, *f*, to which is fastened a needle-bar, *g*, carrying at the free end an eye-pointed needle, *h*. Around the eccentric is a ring or strap, *i*, to which is attached a rod, *k*, whose other end is by a pivot secured to the needle-bar at *k'*. A revolution of the main shaft will, therefore, cause the needle to descend in a vertical plane through the material and through a small hole in the table, and rise up again.

Resting upon the cam *c c* is a roller, *l*, mounted on one end of a lever, *m*, pivoted at *m'*, while its other end is forked at $m^2$, and embraces a pin, $m^3$, depending from a slide, $m^4$, supported in suitable guides, $m^5$, and this bar carries a thread-carrier, *n*. To the depending pin is attached one end of a coil-spring, *x*, whose other end is attached to some stationary part of the machine, and this spring tends to draw the thread-carrier backward, and to keep the roller *l* pressed upon the cam, these parts being such that a revolution of the main shaft causes the thread-carrier to reciprocate in such time and direction as to make the stitch described. Upon the same cam *c* rests another roller, *p*, supported on one end of a lever, *p'*, pivoted to a hanger on the under side of the table, and the other end of this lever is connected at $p^2$ with another lever, $p^3$, pivoted at $p^4$, the other end of the latter lever being pivoted to a hand or pawl, $p^5$, that takes into a ratchet-wheel, $p^6$. There is a small coiled spring to hold the pawl up to its work, and another, similar to spring *x*, to cause the roller *p* to bear upon the face of cam *c*, the whole connection being such that each rotation of the main shaft causes the ratchet-wheel to move in the direction of the arrow *o*. This wheel is mounted upon a proper shaft, and upon the same shaft and so secured as to turn with the ratchet-wheel is a pulley, $q$, and at the other corner, on the same side of the machine is supported upon a proper shaft another pulley, $q'$. A stout belt, $q^2$, encircles these two pulleys, and the upper surface of this belt is level, or nearly so, with the upper surface of the table. From the table rises a standard, $r$, which fits into a hole in the table, and is screwed at its lower end, a nut being applied to the screw, so that the standard may be turned on its own axis and held in any required position. The top of this standard is pierced, and through the hole passes the rod $r^2$, which may be slid out and in and confined in any desired position by a small set-screw. Upon this rod are mounted two links or radius-bars, $r^2$ $r^3$, whose other ends embrace the ends of a shaft, $r^4$, which carries a roller, $r^5$. The whole connecton is such that the roller can be lifted up from the belt or caused to rest upon it nearly in front of the needle, or it may be made to rest partly upon the belt and partly upon the table a little nearer the ratchet-wheel than is shown in Fig. 1. The roller may also be turned over, and will then rest on the belt over the pulley $q$, as shown by dotted lines on the drawings. At the back of the machine are two standards, $s$ $s$, supporting-shafts $s'$ $s'$, on which are to be mounted and fixed bobbins or spools $s^2$ $s^2$, and also retarding-wheels $s^3$ $s^3$, which are pressed upon by springs $s^4$ $s^4$, whose force may be regulated by set-screws. These standards also carry a cross-piece to which are fastened two tension-springs—$t$ for the upper, and $u$ for the lower, thread. Thread is to be wound upon these bobbins and passed through the eyes in the tension-springs, and then through the eyes of the needle and the thread-carrier, as shown in Fig. 2, the lower thread passing through an eye in the slide before it goes through the eye of the thread-carrier. The springs $s^4$ $s^4$ are then to be set up, so as to produce sufficient retardation to the passage of the thread from the bobbins, and the machine will be ready for operation.

The material to be sewed is to be laid upon the table and over the belt and under the pressing-roller $r^5$, and as the main shaft is revolved the cloth will be moved forward step by step when the ratchet acts on the wheel, and will be held at rest while the ratchet is retreating to take a new hold.

The roller in sewing very stiff stuffs—such as canvas and padding—may rest in the position shown in red lines, while for thin stuffs it should rest as shown in full lines, or entirely on the belt in front of the needle. The belt should come about level with the surface of the table opposite the needle when the roller is lying on it, and the rollers that carry the belt may be so mounted that they shall rise above the surface of the table, so as to allow for the sagging of the belt. Now as the belt is an endless one, it can move cloth along so as to sew seams of indefinite length, and as the cloth is only taken hold of by the feed apparatus, and is not fastened or basted to it, it can be turned while being sewed. The seam can be examined, if desired, on both sides as fast as formed, because the feed takes hold of the cloth at only one point at a time, and it will be observed that the place or spot in the material which the feed takes hold of is continually changing. After the cloth has been advanced the length of one stitch the needle descends piercing the cloth and carrying a loop of its own thread below it. When down to its full extent, there is a space between the needle and its thread below the table, owing to the curvature of the needle, which is curved in a circle of which the bar $g$ is the radius. The thread-carrier, now advancing, passes between the needle and its thread, carrying a loop of lower thread with it. This operation may be facilitated, if desired, by cutting a small notch in the needle at the place where the point of the thread-carrier passes it. When the thread-carrier has thus inserted its loop of thread, the needle rises out of the material, leaving a loop of upper thread around the thread-carrier, which is then advanced to its full extent. The thread-carrier now retreats a little, drawing back with it the loop of needle-thread that surrounds it, and the feed apparatus advances the material toward the heel of the thread-carrier, carrying the part of this loop of needle-thread which is nearest the seam with it. By this combined action of the thread-carrier and the feed, the part of the loop of lower thread extending from the thread-carrier to the under side of the cloth, and the loop of upper thread surrounding the thread-carrier, are both drawn away from the thread-carrier and out of the path of the needle, and the latter descends again through a little triangle bounded on one side by the thread-carrier, on another by a piece of lower thread, and on the third by a loop of upper thread. The size of the space bounded by the second thread, loop, and thread-carrier may be enlarged by cutting a notch in the side of the thread-carrier at the place where the point of the needle passes it, and the machine shown in the drawings has both the needle and thread carrier notched. As described, the needle and the thread carrier each pass through spaces between the other and the thread thereof, and these spaces need be but small, as when the points of the needle or thread carrier are once properly entered into the spaces their bodies necessarily follow. When the needle is fairly through the before-named triangle, the thread-carrier retreats to its full extent, slips out of or casts off the loop of upper thread that surrounds it, and again advances, passing between the needle and its thread. A succession of such motions of the feed and stitching apparatus forms a seam in material supported by the table against the thrust of the needle, the table also presenting the cloth to be taken hold of by the feed.

It should be noted that it is essential that the thread-carrier should at certain times lie between the needle and upper thread, although the precise way in which a space is formed between them is unimportant; and it is also essential that the needle should pass between the thread-carrier and the lower thread, but the precise manner in which that space is formed is not essential. This space is formed in the machine represented in the drawings in the manner described, owing to the fact that the thread-carrier moves in lines at an angle to the direction of the seam and not in the line of seam, and also to the fact that the feed is away from and toward its point. It is essential, also, that the needle should pierce the material, and that the thread-carrier should at times be within loops of upper thread beneath the cloth, and at other times out of them. The needle will have the cloth stripped off when it rises for two reasons—first, because the roller sags down on the belt; second, because a loop of upper thread is held below the material as the needle rises, and this latter peculiarity is sufficient to hold the cloth down when the pressing-roller lies on top of the other roller and far away from the needle. The precise method of holding down the material is unimportant.

When the machine is operated as described, the threads will be interlocked in the manner shown in Fig. 4, but the interlockings will be drawn up tight, so as to make a firm tight seam, the tightness of the stitch being regulated by the friction on the bobbins.

We claim—

1. In combination, first, an eye-pointed needle which descends and carries its thread through the material supported on a table; second, a table which supports the material horizontally below the needle and above a thread-carrier; third, a thread-carrier below the table, carrying a thread which is not passed through the material, operating together, substantially as set forth, in a machine making the double-looped seam herein described.

2. In combination, first, a horizontal table or support; second, a feeding apparatus; third, a stitching apparatus, each having the distinguishing characteristics hereinbefore specified, and operating, substantially as set forth, to make the double-looped seam herein described.

In testimony whereof we have hereunto subscribed our names.

W. O. GROVER.
WM. E. BAKER.

Witnesses:
J. H. BROWN.
JAMES C. WADE.